Aug. 28, 1945.  C. ARNDT  2,383,436
GREASE TRAP
Filed Aug. 20, 1942  2 Sheets-Sheet 1
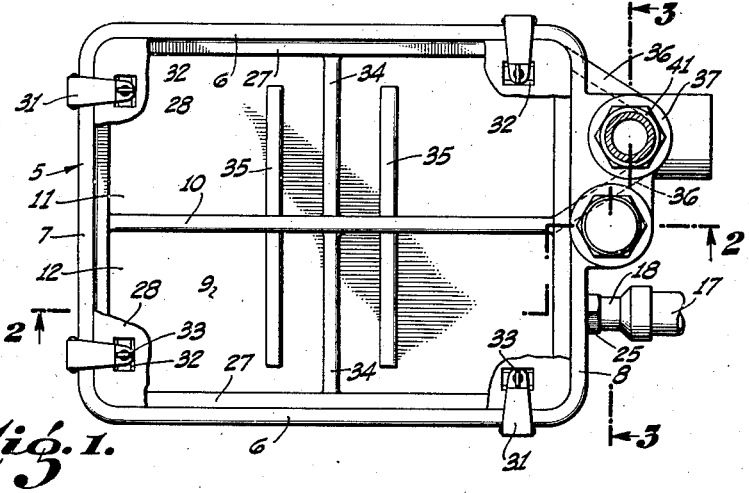
INVENTOR
Charles Arndt
By Joseph F. Westall
ATTORNEY.

INVENTOR
Charles Arndt
By Joseph F. Westall
ATTORNEY.

Patented Aug. 28, 1945

2,383,436

UNITED STATES PATENT OFFICE 2,383,436

GREASE TRAP

Charles Arndt, South Pasadena, Calif.

Application August 20, 1942, Serial No. 455,447

9 Claims. (Cl. 182—9)

This invention relates to grease traps of the general character commonly employed to receive the waste waters from plumbing fixtures, such as sinks and the like, for the purpose of intercepting grease and other lighter-than-water substances which would otherwise tend to accumulate in conduits leading therefrom to the main sewage disposal line.

Grease traps of the type contemplated herein embody essentially a chamber through which the waste water is conducted at a sufficiently reduced rate of flow to permit the lighter substances to rise to the surface of the chamber where they are accumulated for subsequent removal, an outlet for the cleared water to the sewage system being provided which is connected to the bottom of the trap.

In some communities it is required that such traps be tightly sealed to preclude emission of noxious gases emanating from the accumulated detritus, and to prevent overflow or leakage of any of the waste water in the event that the outlet or any conduit leading therefrom should become clogged. It will be readily appreciated that with the top sealed, such a device can be rendered completely ineffective should the waste water contain an excessive amount of air or other gas, which, rising in the trap, would soon displace the liquid as well as the collected grease.

Moreover, if it is impossible to vent the outlet, a partial vacuum, created in the outlet conduit, will have a siphonic effect upon the fluid in the trap. When this occurs, regardless of the form of the trap or its efficiency under normal conditions, not only the waste water but the greasy accumulations therein will be drawn into the conduits leading to the sewage system. A normally effective trap subject to such siphonic action may be more dangerous in use than one less efficient, due to the fact that its accumulations of greasy detritus may be drawn off as a mass, almost invariably clogging the plumbing.

It is a general object of the present invention to provide a sealed trap of the character above generally alluded to, adapted to overcome the difficulties mentioned incorporating a bypass between the top of the inner chamber and the outlet which, under normal fluid conditions, is closed by the waste water to the passage of sewer gases into the trap, but which, upon the lowering of the fluid level incident to siphonic action of the sewage system or due to pressure of accumulated gases, is effective to break the siphon as well as prevent the accumulation of an excessive volume of gas tending to impair the efficiency of the device.

Another object is to provide a flexible fluid-tight connection between the body of the trap and the fixture serviced by the former so as to compensate for sagging of the sink plug or lateral shifting of the plumbing with which the device is associated in use.

Another object is to provide a trap suitable for construction of vitreous china or any other material adapted to withstand the temperature and chemicals carried by fluids for the separation of which it is employed, embodying a novel arrangement of baffles within the body of the device operable to retard and spread the flow of waste water therethrough so as to facilitate separation of the lighter substances.

Another object is to provide a trap comprising a basin, divided longitudinally to form a pair of identical trap chambers, each having openings in one outer wall thereof adjacent to bottom of the trap, in combination with the structural independent inlet and outlet fittings adapted for connection, interchangeable, with either of said openings, to facilitate installation of the device in restricted areas.

Another object is to provide a novel form of clamping device by which the cover of the trap may be quickly and easily secured in position and, where necessary, sealed to prevent escape of gases or overflow of the liquids directed thereinto.

Other objects and corresponding advantages, such for example as facility in cleaning the trap chamber, simplicity of construction, and economy of manufacture, will be apparent to those of skill in the art upon an examination of the following description, read in the light of the accompanying drawings, in which:

Fig. 1 is a plan view of the trap comprising one embodiment of my invention with the top cover removed, showing the interior construction and the relative disposition of the baffles;

Fig. 2 is a sectional view of the device taken on lines 2—2 of Fig. 1, illustrating particularly the vent pipe extending between the upper part of the body of the trap and the outlet;

Fig. 3 is a transverse sectional view, taken on lines 3—3 of Fig. 1 through the outlet pipe and vent;

Fig. 4 is a broken sectional view of the inlet pipe and of the means by which it is flexibly connected to the body of the trap.

Figure 5:
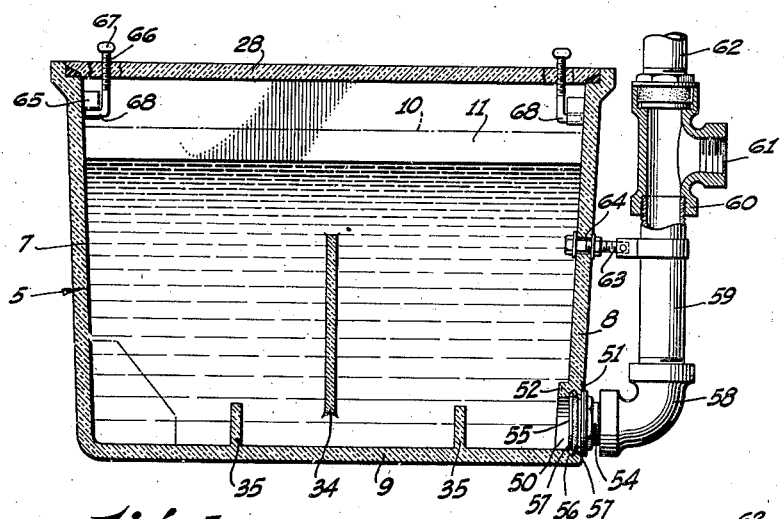
Fig. 5 is a longitudinal sectional view through a trap comprising a modification of my invention.

Referring to the drawings in detail, the numerals of which indicate similar parts throughout the several views, 5 designates generally the body of the device which may be composed of metal, vitreous china or glazed pottery. The trap, rectangular in plan, comprises side walls 6 and end walls 7 and 8 and bottom 9. The inner sides of the upper edges of the walls of the trap are cut away to form a ledge 27 for the support of a cover plate 28. A gasket 29 of suitable compressible material such as rubber or the like is interposed between cover 28 and ledge 27. A lug 30 projects from the outer surface of the trap adjacent each of the corners, for the pivotal support of one end of a clamping bar 31 adapted to be swung over the upper edge of the trap so as to overhang the cover. The upper surface of cover 28 is recessed in the plane of movement of the respective bars 31 as at 32 to accommodate the free ends of the latter which are bent to decline into the recesses 32 when the bars are arranged in clamping position. A thumb screw 33, threaded through the free end of each bar 31 at right angles thereto, is adapted to be turned into engagement with the side of the recess to urge the cover firmly onto gasket 29 and thus assure fluid-tight seal of the upper part of the trap while permitting facile removal of the cover for periodic cleaning of the interior of the trap chambers, about to be described.

A partition 10, extending between end walls 7 and 8, divides the trap longitudinally into a pair of trap chambers 11 and 12 which are communicated with one another over the top of partition 10 for the passage of gaseous substances separated from the waste waters, as will appear. The lower corner of partition 10 adjacent end wall 7 is diagonally cut away as at 13 to form an opening for the flow of the waste water from one trap chamber to the other. It will be observed that as the width of opening 13 gradually diminishes toward its upper edge, water flowing from one chamber to the other through the opening will be drawn from closely adjacent the bottom of the trap. The bottom 9 in chamber 11 at the opposite end of the trap is inclined toward the adjacent end wall 8 in which is provided an inlet opening 14. The edge of end wall 8 encircling inlet opening 14 is recessed as at 15 to form an annular clamping bead 16. In use, the trap is disposed at a level below the sink or other fixture from which the grease-laden waters are to be carried by a drain pipe 17 connected to the sink plug (not shown). If end wall 8 of the trap is composed of metal or the like, opening 14 may be threaded and any of several common forms of fittings employed to effect a connection between pipe 17 and the trap. Where such a rigid connection is employed however, any shifting of the fixture, trap and intermediate plumbing will invariably break the solder connection between the sink plug and drain pipe 17. Fig. 4 illustrates a novel form of slip joint connection particularly adapted for use in conjunction with the trap composed of frangible material unsuitable for a threaded connection. To this end a tubular member 18 having a polished surface is threaded on the end of pipe 17. Encircling the tubular member 18 is a spud 19 having an oblique flange 20 of an outside diameter only slightly less than the diameter of the opening through bead 16, whereby it may be inserted into the opening for disposition in recess 15 behind the bead. A rubber gasket 21, encircling spud 19 adjacent the oblique flange 20, is formed with dual annular flanges 22 and 23, corresponding in contour and angular relationship with the inner and outer surfaces of bead 16, with opposite sides of which the respective gasket flanges engage. A clamping nut 24 threaded on spud 19 against the outer flange 23 of gasket 21 is operable to draw the spud flange 20 against the complementary inner flange 22 of the gasket so as to compress the gasket 21 and form a fluid tight flexible seal between spud and the trap. A packing nut 25 is threaded on the rearward end of spud 19 to compress a rubber ring gasket 26 against the end of spud 19 and assure a fluid-tight but slidable connection between the spud and tubular member 18. It will thus be seen that any sagging of the fixture or drain pipe 17 will be absorbed by the gasket 21 or ring 26 or be compensated by the axial movement of the tubular member 18 in spud 19.

Integral with the partition 10 and respective side walls 6 are a pair of transverse baffle plates 34 which are preferably equi-spaced between the end walls 7 and 8 and are elevated with respect to the bottom of the trap. The upper edge of each baffle plate 34 is disposed below the intended fluid level of the trap to permit the grease and other debris, rising through the fluid to the top of either of the trap chambers 11 and 12, to distribute itself evenly throughout the latter.

A pair of dams 35 integral with bottom of the trap extend from each side of partition 10 in the respective trap chambers. In each chamber the dams 35 are equi-spaced from opposite sides of the baffle plate 34, as indicated in Fig. 1. Each dam is preferably of the length equal to approximately three-fourths the distance between partition 10 and the opposed side wall 6 and of a height sufficient to extend slightly above the lower edge of the baffle plates 34.

It will be understood that while I have described the partition 10, baffle plates 34 and dams 35 is being integral with the body of the trap, these parts may be structurally independent or integral with one another but separate from bottom 9 and the side walls 6 to permit their removal to facilitate cleaning. An outlet opening in the lower portion of end wall 8 comprising the end of trap chamber 11 extends the width of the chamber 11. A pair of converging walls 36 project from the side edges of the opening to form with a generally-triangular extension 37 of the bottom of the trap, an outlet chamber 38. A tubular outlet conduit 39 integral with the walls 36 of outlet chamber 38 extends vertically upward and terminates in a bell end 40 flush with the upper edge of the trap for connection in a suitable manner of a short pipe 41 to which a clean out plug, cap or vent pipe may be threaded. A side opening 42 is formed in the tubular member in the plane of the fluid level desired in the trap chamber and is provided with an integral bell fitting 43 into which a sewage disposal pipe (not shown) may be connected by the use of cement or the like.

Laterally of the outlet 39 a vent tube 44 is provided which in the embodiment of the trap of Figs. 1-4, is integral with the outlet conduit and body of the trap. Tube 44 is communicated at its lower end with the side of the outlet slightly below the lateral drain opening 42, as at 45. The upper end of tube 44 terminates flush with the top of the walls of the trap and is connected to the outlet 39 and adjacent end wall 8 by a web 46 in which an annular channel 47 encircling the upper end of tube 44 is formed. A passage 48 is provided through web 46 and wall 8 which connects channel 47 with the interior of the trap at the upper part of adjacent end wall 8. A short normally-capped pipe 49 is fitted into the enlarged upper part of the bore of channel 47 through the bore of which the channel and tube are communicated.

The operation of the trap in separating grease and other lighter-than-water particles flowing with the waste water from the drain to which the trap is connected is briefly described as follows: As water passing from drain pipe 17 enters the trap its rate of flow immediately decreases due to the greater cross sectional area of the trap chamber 11 with respect to the drain pipe. Accordingly the lighter particles will immediately tend to separate and begin to rise to the surface of the liquid in the trap. The water is prevented from forming a stream between drain pipe 17 and opening 13 by the dams 35 and baffle plate 34. The water from the inlet strikes the dam 35 disposed between inlet and baffle 34, which causes the flow to spread throughout the width of the trap. Some of the water flows over the dam while that which is directed laterally toward the side wall is permitted to flow around the end of the dam. The water is then compelled to flow under baffle 34 which functions to further distribute the waste water throughout the width of trap chamber 11, thus assuring uniform retardation of the flow. Water passing under the baffle plate 34 in chamber 11 adjacent partition 10 is compelled to rise in order to flow over the adjacent dam 35. As the opening 13 in partition 10 is at the bottom of the trap, this water will, immediately after passing over the dam 35, return to adjacent the bottom 9 of the trap so as not to disturb the accumulations of grease on the surface. Water flowing adjacent the outer side wall 6 of the chamber 11 moves under baffle 34 in a wide arc to opening 13. It will thus be seen that baffle plate 34 and opening 13 confine the grease-laden water to the bottom of the trap so as not to disturb the greasy substances theretofore collected. In the opposite trap chamber 12 the water is similarly compelled to flow either over or around the first dam 35 and thence under the baffle plate 34. The part of the flow passing near partition 10 rises over the dam 35 at the opposite side of the baffle, which serves to increase the distance travelled as well as to slow down the rate of the flow by distributing the flow uniformly throughout the width of chambers 11 and 12. The converging walls 36 of the outlet chamber 38 draw water from the entire lower portion of trap chamber 11 into the outlet chamber so as to further obviate any tendency toward the formation of a stream or current from inlet 14 to the outlet. It will be observed that due to the arrangement of dams 35 and baffle 34 the greatest volume of the flow from the inlet to the outlet follows an undulated path close to the bottom of the trap while the rest of the liquid moving to the outlet flows in a wide arc which affords ample time, with the retarded rate of flow, for the greasy substances to separate.

The fluid level within the trap will be normally determined by the outlet from which the cleared water will flow as rapidly and in the same volume as waste water enters the trap through the drain pipe 17. Should a partial vacuum be created in the sewage system, the suction drawn on the outlet conduit 39 shall be communicated to the upper part of the trap through tube 44, channel 47 and passage 48 so as to prevent the siphoning of the waste water from the trap chamber to an extent which would tend to agitate the accumulations of grease or permit any part of the same to be drawn off through the outlet conduit 39. It will also be observed that air carried with the waste water will, with the grease, tend to rise in the trap and accumulate under the sealed cover 28. In the absence of a suitable vent, an excessive amount of air carried into the trap by the waste water and accumulating in the upper part of the trap, will soon displace enough of the water to seriously interfere with continued efficient operation. Any tendency toward the development of this condition during the use and operation of the present device is obviated by the communication between the upper part of the trap and the outlet conduit 39 through the vent tube 44. The volume of air or other gases thus accumulating would be limited to the volumetric capacity of the trap above the point of connection 45 between tube 44 and outlet conduit 39. As the flow from the inlet to the outlet is closely confined to the bottom of the trap by the baffle plates 34 there will be a sufficient depth of fluid in the trap even when lowered to the level of the lower end of tube 44, to assure highly efficient operation.

The cover 28 may be easily and quickly removed by releasing the thumb screws 33 and swinging the clamping bars 31 over the edge of the trap. If partition 10 and baffle plates 34 are made removable the cleaning operation is greatly facilitated. It will be noted that while tube 44 is effective to vent the trap into the outlet conduit 39 when necessary, normally the fluid level will be above the lower end of tube 44, thus preventing the entry of sewer gases into the trap or escape of such gases therefrom when cover 28 is removed for cleaning purposes.

It will thus be seen that I have provided a device comprising a closed receptacle sealed against the escape of gaseous and other fluids by a flexible connection, in the sewage line, in which waste water, directed thereinto is uniformly spread with a consequent retarded rate of flow to enable effective separation of the grease, air and other lighter-than-air particles to the upper part of the receptacle from which the same may be removed with facility, and incorporating means to relieve the pressure of gaseous accumulations in the upper part of the receptacle on the fluid by bypassing said gases into the sewage disposal pipe, said means also being effective as an anti-siphon expedient to prevent fluids from being drawn from the receptacle below a predetermined level, thereby assuring a sufficient fluid volume within the receptacle for efficient operation.

Figure 6:
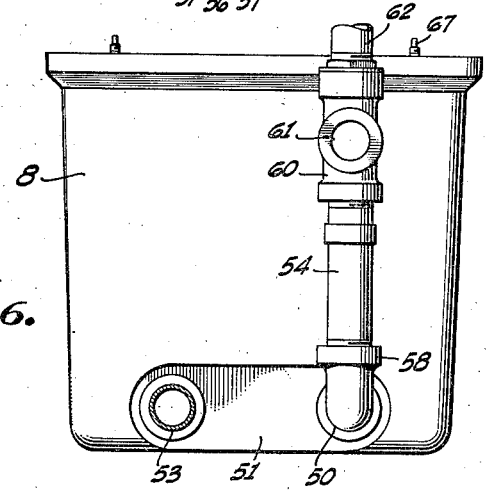
Fig. 6 is the end elevation of the trap shown in Fig. 5.

In Figs. 5 and 6 I have shown a modified form of trap, embodying the present invention. The body of the trap is substantially the same as the device of Figs. 1-4, including the partition 10 which divides the trap longitudinally to provide trap chambers 11 and 12, and a baffle plate 34 extending laterally from each side of the partition.

Dams 35 formed preferably integral with the bottom of the device, function as above described. A pair of openings 50 are formed in one end of the trap registering with respective trap chambers 11 and 12. The form and location of openings 50 with respect to the adjacent side walls and the bottom of the trap are identical whereby the inlet and outlet fittings about to be described more in detail, may be connected to either of said openings. The edge of each opening 50 is recessed as at 51 to provide an annular bead 52 to one of which the flexible connection for an inlet pipe 53 is attached in the manner hereinabove described with reference to the embodiment as shown in Figs. 1-4. An outlet fitting is connected to the opposite opening 50, comprising a threaded pipe 54 having a flange 55 at one end of a diameter slightly less than that of bead 52 to permit the extension of the flanged end 55 of the pipe into the opening 50. The flange provides a seat for a gasket 56 having a pair of spaced annular flanges 57—57 engageable with opposite sides of bead 52. A clamping nut threaded on pipe 54 compresses the gasket to effect the seal between the body of the trap and said pipe. To the outer end of pipe 54 an elbow 58 is threaded for the attachment of a vertically disposed short pipe section 59. A T-fitting 60 secured to the upper end of section 59 affords a lateral threaded outlet 61 which determines the fluid level within the trap chambers, and to which a sewer pipe (not shown) may be connected. A vent pipe 62 is secured in any conventional manner in the upper end of the T-fitting to prevent siphoning of the trap. A strap encircles pipe section 59 and is secured to the adjacent end of the trap by a bolt 63, extending through a suitably located hole 64 in the end wall of the trap to reinforce the outlet fitting. If the outlet and inlet fittings are attached in opposite openings 50, it will be understood that a plug (not shown) may be employed to close the hole 64 not used.

The cover 28 of the trap is secured on a ledge 27 by novel clamping means adapted to engage under each of a series of lugs 65 integral with the inner surface of the trap adjacent each corner slightly below the ledge 27. A screw 66 is threaded through cover 28 adjacent each lug 65. Wings 67 on upper end of each screw 66 facilitate manual turning of the latter in a counter-clockwise direction to swing a lateral extension 68 at the lower end of the screw under the adjacent lug 65. Coincidentally, extension 68 is raised by the threads on the shank of the screw so as to engage the underside of lug 65 and draw the cover tightly onto the ledge of the trap. The separation of the lighter-than-water constituents of the fluid introduced into the trap is effected in the same manner as in the embodiment of Figs. 1-4 regardless of the opening 50 to which the respective inlet and outlet fittings are connected.

Figure 7:
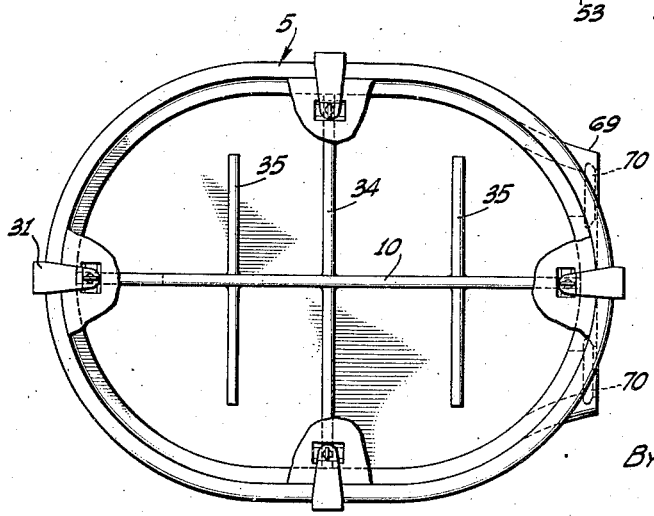
Fig. 7 is a plan view of third embodiment of different contour, showing the top cover broken away.

It will be understood that the contour of the body of the trap may be varied to meet specific requirements. In Fig. 7 a trap is illustrated having the form, in plan, of an ellipse which is particularly adapted to be moulded from vitreous china. The lower portion of one end of the trap is projected as at 69 to provide two openings 70, identical in form, communicating with opposite trap chambers for connection of the inlet and outlet fittings hereinabove described, whereby the flow through the trap may be in either direction, depending upon to which of the openings the respective inlet and outlet fittings are connected.

While I have illustrated and described but one embodiment of my invention, it will be apparent to those of skill in this art that numerous changes in size, design, shape and number of the various parts may be made, that additional baffles may be provided which may vary in size and arrangement depending upon the capacity of the trap and the grease content of the fluid passing from the fixture being serviced, that any well-known means for removably securing and sealing the cover in place may be substituted for that shown, and that insofar as the function of the tube in preventing the siphoning of the trap and relieving pressure of gas accumulated therein is concerned, the tube 44 may be connected directly with the end wall of the trap adjacent the upper part of the latter—all without departing from the spirit of my invention as defined in the appended claims.

What I claim and desire to secure by Letters Patent is:

1. In a trap, a basin comprising side walls and a bottom, a partition dividing the basin longitudinally to form a pair of trap chambers communicated with one another through an opening in the partition, a baffle in each trap chamber extending between said partition and the opposed side walls respectively, and spaced from the bottom of the trap, and a dam in each trap chamber extending laterally from the partition and upwardly from the bottom of the trap, said dams being spaced from the side walls of the trap.

2. In a trap, a basin comprising side walls and a bottom, a partition dividing the trap into two trap chambers, said partition having an opening therein communicating said trap chambers with one another, one of said side walls having inlet and outlet openings therein closely adjacent the bottom of the trap, a baffle within each trap chamber extending laterally from opposite sides of the partition, and spaced from the bottom of the trap, and a dam between the opening and the baffle in one of said trap chambers extending upwardly from the bottom a distance slightly greater than the distance between the bottom of the trap and the lower edge of the last named baffle.

3. In a trap, a basin comprising side walls and a bottom, a partition dividing said trap to form a pair of trap chambers, one of said walls having a pair of openings therein communicating with respective trap chambers, said partition having an opening therein adjacent the bottom and the wall opposite to the wall in which said openings are located, said opening in the partition being of gradually diminishing width toward its upper edge.

4. In a trap, a basin comprising walls and a bottom, a partition dividing a trap into two trap chambers, said partition having an opening therein adjacent the bottom, a baffle plate transverse to said partition in each trap chamber and spaced from the bottom, a pair of dams supported on the bottom in each trap chamber, extending from opposite sides of the partition, said dams projecting upwardly a distance slightly greater than the distance between the bottom of said baffle plates, and spaced from the adjacent transverse walls of the trap, an inlet and an outlet opening in one wall of the trap adjacent the bottom, opening into respective trap chambers.

5. In a trap, a basin comprising side walls and a bottom, a cover plate, means to clamp said cover plate on said basin to seal the top of the latter, one of said walls having an inlet and an outlet opening adjacent the bottom thereof, an outlet conduit connected to said outlet opening extending upwardly exteriorly of said basin to adjacent the upper edge of the latter, said conduit having a cleanout opening at its upper end and a lateral outlet opening adjacent its upper end, means forming a channel communicated with the upper part of the basin and opening exteriorly of the basin laterally of and substantially at the same level as said cover plate, a separately-removable cap sealing said exterior opening in said channel, and a tubular member leading from said outlet conduit intermediate the lateral opening therein and the lower end thereof to said channel.

6. In a trap, a basin comprising side walls and a bottom, a cover plate, means to clamp said cover plate on said basin to seal the top of the latter, one of said walls having an inlet and an outlet opening adjacent the bottom thereof, an outlet conduit connected to said outlet opening extending upwardly exteriorly of said basin to adjacent the upper edge of the latter, said conduit having a lateral outlet opening adjacent its upper end, means forming a channel communicated with the upper part of the basin and opening exteriorly of the basin laterally of and substantially at the same level as said cover plate, a separately-removable cap normally sealing said exterior opening in said channel, and a tubular member leading from said outlet conduit intermediate the lateral opening therein and the lower end thereof to said channel.

7. In a trap, a basin having an inlet and an outlet opening therein, a vertical partition in said basin having an opening therein adjacent the bottom thereof, said opening being of lesser cross-sectional area adjacent its upper edge than at its lower edge.

8. In a trap, a basin comprising side walls and a bottom, a partition, dividing said basin into two trap chambers, said partition having an opening in one end thereof adjacent the bottom of the partition, said basin having inlet and outlet openings therein opening into respective trap chambers, and baffles disposed in each trap chamber arranged transversely to said partition to afford a sinuous passage adjacent the bottom of the basin for fluid moving from the inlet opening through the opening in the partition to the outlet opening.

9. In a trap, a basin comprising side walls and a bottom, said basin having inlet and outlet openings, and means comprising a plurality of baffles disposed adjacent said bottom of said basin defining a passage for fluid from said inlet to said outlet openings, said passage being sinuous in a vertical plane to effect an undulating movement in fluid flowing from said inlet to said outlet opening, respectively.

CHARLES ARNDT.